United States Patent [19]

Kubo et al.

[11] 4,341,648

[45] Jul. 27, 1982

[54] METHOD FOR MANUFACTURING MAGNETIC POWDER FOR HIGH DENSITY MAGNETIC RECORDING

[75] Inventors: Osamu Kubo; Tadashi Ido; Tutomu Nomura; Koichiro Inomata, all of Yokohama, Japan

[73] Assignee: Tokyo Shibaura Denki Kabushiki Kaisha, Kawasaki, Japan

[21] Appl. No.: 203,153

[22] Filed: Nov. 3, 1980

[30] Foreign Application Priority Data

Nov. 8, 1979 [JP] Japan ................................ 54-143859

[51] Int. Cl.³ ............................................. C04B 35/26
[52] U.S. Cl. ............................ 252/62.63; 252/62.56; 252/62.58; 252/62.59; 423/594
[58] Field of Search ............... 252/62.56, 62.58, 62.59, 252/62.63; 423/594

[56] References Cited

FOREIGN PATENT DOCUMENTS 233767  5/1961  Australia ......................... 252/62.63

OTHER PUBLICATIONS

Journal of the American Ceramic Society, vol. 53, No. 4, 192, (1972), B. T. Shirk, W. R. Buesser, Magnetic properties of Barium ferrite formed by crystallization of a glass.

Osaka Kogyo Jijutsu shikenuo 15 [4] 285, (1964), Hideo Tanigawa, Hirokichi Tanaka, Magnetic microcrystalline materials produced by crystallization of a glass in the $B_2O_3BaOFe_2D_3$ system.

Kajima et al., "Proceedings of the Int. Conf.: Ferrites", 1970, pp. 380–382.

Haneda et al., "Chem. Abstracts", vol. 83, 1975, 125281n.

*Primary Examiner*—Jack Cooper
*Attorney, Agent, or Firm*—Oblon, Fisher, Spivak, McClelland & Maier

[57] ABSTRACT

A method for preparing a magnetic powder for high density magnetic recording includes melting a mixture containing the fundamental component of a hexagonal ferrite, a substituting component for reducing the coercive force, and a glass forming material. The resultant molten material is rapidly cooled to obtain an amorphous body which is then heat-treated to produce desired substituted type hexagonal ferrite particles in the glass matrix.

12 Claims, 3 Drawing Figures

F I G. 1
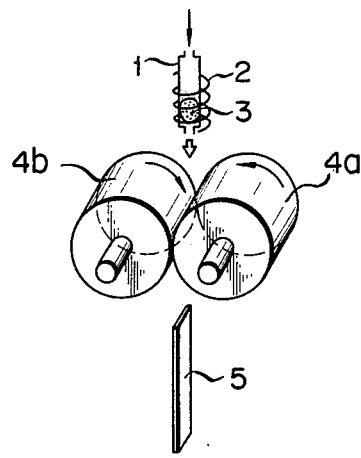
F I G. 2
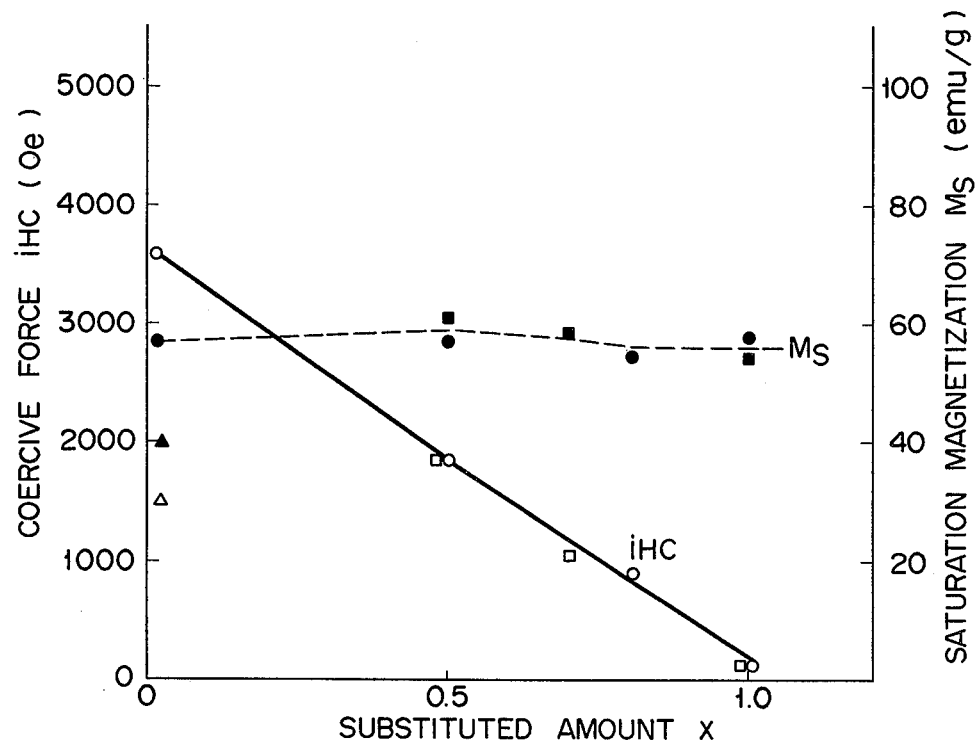

METHOD FOR MANUFACTURING MAGNETIC POWDER FOR HIGH DENSITY MAGNETIC RECORDING

BACKGROUND OF THE INVENTION

1. Field of the Invention

The present invention relates to a method for manufacturing a magnetic powder for high density magnetic recording and, more particularly, to a method for manufacturing a magnetic powder for vertical magnetic recording.

2. Description of the Prior Art

Magnetic recording has been conventionally based on magnetization along the longitudinal direction of the plane of the recording medium. However, when an attempt is made to record at a high density in such a recording system, the demagnetizing field within the recording medium increases. Thus, it is difficult to achieve high density recording with this recording system.

To the contrary, in a vertical magnetic recording system, the demagnetizing field within the recording medium decreases even when the recording density is increased, so that this system may be considered to be suitable for high density recording. With such a vertical magnetic recording system, it is necessary that the axis of easy magnetization be normal to the surface of the recording medium. Among such recording media, there is known a recording medium which is obtained by mixing a magnetic powder with a binder and coating the mixture on a tape.

As such a magnetic powder, hexagonal ferrites such as barium ferrite ($BaFe_{12}O_{19}$) are used. These hexagonal ferrite powders are in plate form and the axis of easy magnetization is normal to the plane of the surface so they are advantageous in that vertical orientation may be easily accomplished by magnetic field orientation processing or mechanical processing. However, for using the hexagonal ferrites for vertical magnetic recording powder, certain conditions must be satisfied.

For example, the hexagonal ferrites are too high in coercive force iHc (generally over 5,000 oersteds) to be recorded by the magnetic head. Thus, it is necessary to reduce the coercive force to a value suitable for vertical magnetic recording.

Further, it is preferred that the crystal size of the hexagonal ferrites be controlled within the range of 0.01–0.3 μm for vertical magnetic recording. When the crystal size is less than 0.01 μm, the ferromagnetism necessary for magnetic recording is not obtained, and when it exceeds 0.3 μm, magnetic recording may not be achieved at high density.

It is further required that the hexagonal ferrites be homogeneously dispersed in a medium such as a paint.

A hexagonal ferrite fine powder which satisfies all of these requirements has not been available as yet. With the general ferrite powder manufacturing method in which the powder raw materials such as oxides, hydroxides, and carbonates are mixed and reacted in solid phase at a high temperature, ion substitution for controlling the coercive force may be possible and the magnetic characteristics of the obtained magnetic powder may be good. However, coagulation of the particles by sintering may not be prevented so that this method is not preferable for manufacturing the magnetic powder for magnetic recording.

Another representative method for manufacturing the hexagonal ferrites is the hydrothermal method. According to this method, an alkali of a high concentration is added to a solution containing ferrite-producing ions and they are reacted at a high temperature and pressure in an autoclave. With this method, individual ferrite particles are produced in a solution and separated from each other so that a powder with extremely good dispersibility is obtained. However, when the particle size becomes less than 0.3 μm as desired, the degradation of the magnetic characteristics becomes significant. Furthermore, when ion substitution is performed for controlling the coercive force, products other than the desired product are produced.

SUMMARY OF THE INVENTION

It is, therefore, an object of the present invention to provide a method for manufacturing a magnetic powder comprising hexagonal ferrites having a relatively low coercive force suitable for vertical magnetic recording.

It is another object of the present invention to provide a method for manufacturing a magnetic powder for a magnetic recording at high density which has a well controlled particle size and which has improved homogeneous dispersibility in the medium.

In order to achieve the above and other ends, the present invention provides a method for manufacturing a magnetic powder for high density magnetic recording comprising:

mixing, together with a glass forming substance, a fundamental component of a hexagonal ferrite including AO or its precursor (wherein A is at least one element selected from the group consisting of barium, strontium, lead and calcium) and $Fe_2O_3$ or its precursor; and a substituting component for reducing the coercive force including MO or its precursor (wherein M is at least one tetravalent element selected from the group consisting of titanium and germanium, or at least one pentavalent element selected from the group consisting of vanadium, niobium, antimony, and tantalum) and CoO or its precursor;

melting the mixture into a molten material;

rapidly cooling the molten material to obtain an amorphous material;

heat-treating the amorphous material to precipitate substituted hexagonal ferrites as mutually separated fine particles in the amorphous material; and separating out said fine particles from said amorphous material;

wherein said fundamental component and said substituting component are mixed in amounts sufficient to provide, as said fine particles, a substituted ferrite selected from the group consisting of $AFe_{12-2x}Co_xM_xO_{19}$ and $AFe_{12-3/2x}Co_xM_{\frac{1}{2}x}O_{19}$ (wherein x is 0.5 to 1.1).

BRIEF DESCRIPTION OF THE DRAWINGS

FIG. 1 is a schematic view of a device for performing an embodiment of the method of the present invention;

FIG. 2 is a graph illustrating the characteristics of the magnetic powder obtained by the method of the present invention together with those of the magnetic powder obtained by the comparative example.

DETAILED DESCRIPTION OF THE PREFERRED EMBODIMENTS

Figure 3:
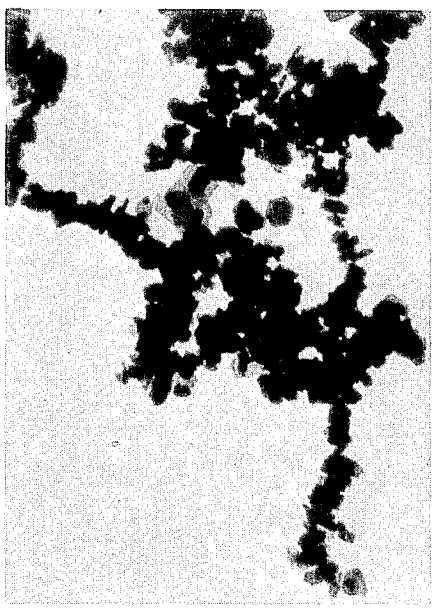
FIG. 3 is a photograph taken with an electron microscope of the magnetic powder obtained by the method of the present invention.

The present invention is based on the finding that the particle size of the ferrite particles may be controlled within the desired range and the dispersion of the obtained fine particles in the medium is improved when the glass crystallizing technique is used wherein the components are melted and rapidly cooled, and are then heat-treated to precipitate the fine particles of ferrite in the glass stratum. The present invention is also based on the finding that ferrites suitable for magnetic recording may be obtained by using a certain kind of oxide or its precursor as a substituting component for reducing the coercive force of ferrites.

The respective components and the manufacturing conditions of the present invention will now be described in more detail.

Hexagonal ferrite fundamental component

The hexagonal ferrite fundamental component used in the method of the present invention includes ferric oxide ($Fe_2O_3$) and an oxide represented by the formula AO. The oxide AO is at least one member selected from the group consisting of barium oxide (BaO), strontium oxide (SrO), lead oxide (PbO), and calcium oxide (CaO). Barium oxide is preferable as the oxide AO.

Substituting component

As has been already described, hexagonal ferrites have a high coercive force and may not be used as the magnetic powder for magnetic recording as it is. The present inventors have found that the coercive force may be reduced by substituting a certain kind of element for the iron ions in the ferrite. The substituting element is cobalt and may be used in the form of an oxide, i.e., CoO, in the method of the present invention.

When the iron ions in the ferrite are replaced by the cobalt ions, the valence becomes deficient. To compensate for the valence without degrading the various characteristics of the ferrite, at least one tetravalent metal element selected from the group consisting of titanium and germanium may be added, or at least one pentavalent metal element selected from the group consisting of vanadium, niobium, antimony and tantalum may be added. These metals may be used in the form of oxides, that is, in the form of $TiO_2$, $GeO_2$, $V_2O_5$, $Nb_2O_5$, $Sb_2O_5$ and $Ta_2O_5$, in the method of the present invention.

Glass Forming Material

The glass forming material functions as a matrix in which the hexagonal ferrite particles precipitate according to the method of the present invention and thus is not particularly limited as long as the selected material is a glass forming material. Representatives of such materials are boron trioxide ($B_2O_3$), phosphorus pentoxide ($P_2O_5$), silicon dioxide ($SiO_2$) and so on. Among these, boron trioxide is preferable. It is preferable to add barium oxide (BaO) to the glass forming material.

Component Ratio

The components are used in amounts sufficient to provide (I) $AFe_{12-2x}Co_xM_xO_{19}$ (wherein M is a tetravalent metal) or (II) $AFe_{12-3/2x}Co_xM_{\frac{1}{2}x}O_{19}$ (wherein M is a pentavalent metal) as a hexagonal ferrite. In the above formulae, x is 0.5 to 1.1. When x is less than 0.5, the coercive force of the resultant ferrite exceeds 2,000 oersteds (Oe), and the coercive force reducing effects are not sufficient. When x is above 1.1, the coercive force becomes less than 200 Oe, so that adequate recording may not be achieved.

The above formula (I) may be rewritten as $$AO \cdot 6\left[\left(Fe\ 1 - \frac{2}{12}x\ Co\frac{x}{12}\ M\frac{x}{12}\right)_2 O_3\right].$$

For obtaining the ferrite represented by formula (I), it is apparent that it is necessary to use AO in an amount of 1/6 time the moles of $Fe_2O_3$, and the molar ratio of $Fe_2O_3:CoO:MO_2$ becomes $$\left\{\tfrac{1}{2}\left(1 - \tfrac{2}{12}x\right)\right\} : \tfrac{x}{12} : \tfrac{x}{12} \approx 11:1:1 \text{ to } 4.45:1:1.$$

Similarly, formula (II) may be rewritten as $$AO \cdot 6\left[\left(Fe\ 1 - \frac{3}{24}x\ Co\frac{x}{12}\ M\frac{x}{24}\right)_2 O_3\right].$$

For obtaining the ferrite represented by formula (II), it is apparent that it is necessary to use AO in an amount of 1/6 time the moles of $Fe_2O_3$, and the molar ratio of $Fe_2O_3:CoO:MO_{2.5}$ becomes $$\left\{\tfrac{1}{2}\left(1 - \tfrac{3}{24}x\right)\right\} : \tfrac{x}{12} : \tfrac{x}{24} \approx 22.50:2:1 \text{ to } 9.40:2:1.$$

Substitution of $Fe^{3+}$ ions by $Co^{2+}$ or M ions proceeds substantially stoichiometrically. Accordingly, it suffices to use the AO component in an amount of 1/6 time the moles of $Fe_2O_3$, but it will not cause any problems if it is supplied in an amount exceeding this value.

The amount of the glass forming material should only be sufficient to provide a matrix allowing precipitation of the fine ferrite particles therein and thus is not particularly limited.

Manufacturing Conditions

The above powder components are well mixed in a mixer or the like. The mixture is then melted at 1200° to 1450° C. and is rapidly cooled (e.g., at a rate of $10^{5°}$ C. per second to room temperature) to obtain the amorphous material. The resultant amorphous material is heat-treated and the desired fine ferrite particles are obtained separated from each other in the glass matrix. The heat treatment for precipitation of the ferrite fine particles is generally performed at 700° to 850° C. for 2 hours or more, practically for 4 to 10 hours in the air.

The melting and cooling of the above mixture is conveniently performed with a device as shown in FIG. 1. This device includes a vertically disposed cylindrical platinum container 1 which has openings at both ends and is surrounded by a high frequency heater 2. The device further includes below the container a pair of rolls 4a and 4b for rotational movement in opposite directions at a rate of 1,000 r.p.m., for example. A raw material mixture 3 is placed in the container 1 and heated by the heater 2 to be melted. Air or oxygen pressure is exerted from the upper end opening of the container 1 on the molten material to force it from the lower end opening over the pair of rolls 4a and 4b for rapid cooling. A homogeneous amorphous ribbon 5 is obtained from between the rolls 4a and 4b. Thereafter, the ribbon is heat-treated in the above manner.

After thus precipitating the desired fine ferrite particles in the glass matrix, the glass matrix is removed by an acid such as dilute acetic acid. The remaining powder is rinsed with water and dried to obtain the desired fine ferrite particles.

The coercive force of the ferrite thus obtained is suitable for magnetic recording, since some of the ions are replaced by cobalt ions and the particle size is within the proper range (0.01 to 0.3 μm), and the particles are not coagulated but are separate from each other.

The present invention will now be described with reference to its examples.

EXAMPLE 1

As the objective product, magnetoplumbite type Ba ferrite was selected and the substitution for control of the coercive force was attempted with the partial replacement of $Fe^{3+}$ ions in the Ba ferrite with $Co^{2+}$-$Ti^{4+}$ ions. $B_2O_3$-$BaO$ based glass forming material was selected. Three types of ferrites were obtained which satisfied the conditions of x=0.5, 0.8 and 1 in the formula of the substituted type Ba ferrite, $BaFe_{12-2x}Ti_xCo_xO_{19}$. The molar ratios of the raw materials in these three kinds of ferrites are shown in Table 1. The ratio of Co-Ti to Fe was calculated assuming that all Fe ions were the constituent ions of Ba ferrites.

TABLE 1

| | Raw Material | | | | |
|---|---|---|---|---|---|
| x | $B_2O_3$ | BaO | $Fe_2O_3$ | $TiO_2$ | CoO |
| 0.5 | 0.258 | 0.394 | 0.294 | 0.027 | 0.027 |
| 0.8 | 0.254 | 0.388 | 0.274 | 0.042 | 0.042 |
| 1.0 | 0.251 | 0.384 | 0.261 | 0.052 | 0.052 |

The raw materials were well mixed in a mixer and the mixture was placed in a platinum container 1 as shown in FIG. 1. The mixture was then heated to 1,350° C. with a high frequency heater 2 for melting. Thereafter, pressure of air or $O_2$ gas was exerted from the top of the platinum container 1 to force the mixture over the pair of rolls 4a and 4b, each 20 cm in diameter and rotating at 1,000 r.p.m., to rapidly cool the mixture. An amorphous ribbon 5 of 50 μm thickness was thus prepared.

This amorphous ribbon was found by X-ray diffractiometry to be a completely homogeneous amorphous body.

The resultant amorphous ribbon was heat-treated in an electric furnace at 850° C. for 10 hours in an air atmosphere. After dissolving the heat-treated ribbon in dilute acetic acid, the remaining powder was rinsed with water and dried. The dried powder was examined by X-ray diffractiometry, by magnetization measurement, and by an electron microscope. The result of the X-ray diffractiometry revealed that the remaining powder was the Ba ferrite stratum. The actual substituted amount of the magnetic powder thus obtained was found by measuring the Curie temperature. Table 2 shows the correlation of the objective substitution amount, the Curie temperature of the obtained powder, and the actual substitution amount obtained from the Curie temperature. It is seen from Table 2 that the objective substitution amount closely corresponds to the actual substitution amount.

TABLE 2

| Objective substitution amount (x) | 0.5 | 0.8 | 1.0 |
|---|---|---|---|
| Curie temperature (°C.) | 382 | 365 | 310 |
| Measurement of the substitution amount obtained from the Curie temperature | 0.52 | 0.70 | 0.92 |

The relation between the magnetic characteristics and the substitution amount of the magnetic powder obtained by the method of the present invention is as shown in FIG. 2. FIG. 2 also shows the same for magnetic powder obtained by the general solid phase reaction method and magnetic powder obtained by the hydrothermal method. In FIG. 2, the saturation magnetization $M_S$ is shown by a solid circle mark, and the coercive force iHc is shown by a hollow circle mark for the case of the solid reaction method; the saturation magnetization $M_S$ is shown by a solid triangle mark and the coercive force iHc is shown by a hollow triangle mark for the case of the hydrothermal method; the saturation magnetization $M_S$ is shown by a solid square mark and the coercive force iHc is shown by a hollow square mark for the case of the present invention. As may be apparent from the figure, the magnetic characteristics of the Ba ferrite obtained by the method of the present invention are superior to those of the magnetic powder obtained by the hydrothermal method and are not bad when compared with those of the magnetic powder obtained by the general solid phase reaction method.

FIG. 3 shows a photograph taken by a transmission type electron microscope (X33000) of the Co-Ti substituted Ba ferrite fine particles obtained by the method of the present invention. The particle size is about 0.2 μm and is very uniform, and the shape (hexagonal) is also good. The individual particles are not coagulated by sintering and are of a single magnetic domain structure. Thus, it is seen that the planes of the fine ferrite particles are reoriented so that they may be magnetically aligned after melting the glass.

EXAMPLE 2

Substantially the same procedure was repeated as in Example 1, using the raw materials listed in Table 3 below. The heat treatment of the resultant ribbons was carried out at 800° C. for 4 hours.

TABLE 3

| | Raw Material | | | | |
|---|---|---|---|---|---|
| x | $B_2O_3$ | BaO | $Fe_2O_3$ | CoO | $Nb_2O_5$ |
| 0.6 | 0.300 | 0.365 | 0.288 | 0.031 | 0.016 |
| 0.75 | 0.295 | 0.365 | 0.278 | 0.039 | 0.020 |
| 1.0 | 0.293 | 0.367 | 0.261 | 0.050 | 0.025 |

The properties of the resultant magnetic powders are shown in Table 4 below.

TABLE 4

| x | iHc(Oe) | Ms(emu/g) |
|---|---|---|
| 0.6 | 1720 | 58 |
| 0.75 | 970 | 59 |
| 1.0 | 220 | 58 |

The magnetic powders were found to have a size of 0.2 μm or less.

Although the components used in the method of the present invention were described as oxides, they may be in the form of precursors such as carbonates and hydroxides which may be converted into oxides by thermal decomposition or the like.

What we claim is:

1. A method for manufacturing a magnetic powder for high density magnetic recording having a particle size within the range of 0.01 to 0.3 microns, comprising:

mixing, together with a glass forming substance, metal oxide or metal oxide precursor components of a substituted ferrite having the formula:

$$AFe_{12-2x}Co_xM_xO_{19} \text{ or } AFe_{12-3/2x}Co_xM_{\frac{1}{2}x}O_{19}$$

wherein A is at least one element selected from the group consisting of barium, strontium, lead and calcium, M is at least one tetravalent element selected from the group consisting of titanium and germanium or at least one pentavalent element selected from the group consisting of vanadium, niobium, antimony and tantalum, and x is a value from 0.5 to 1.1;

melting the mixture into a molten material;

rapidly cooling the molten material to obtain an amorphous material;

heat-treating the amorphous material in the range between 700° and 850° C. to precipitate a substituted hexagonal ferrite as mutually separated fine particles in the amorphous material; and separating the fine particles from the amorphous material wherein said metal oxide or metal oxide precursor components are mixed in an amount sufficient to provide, as said fine particles, a substituted ferrite of said formulation.

2. The method as claimed in claim 1, wherein M is a tetravalent metal.

3. The method as claimed in claim 2, wherein the molar ratio of $Fe_2O_3:CoO:MO_2$ is about 4.45:1:1 to 11:1:1.

4. The method as claimed in claim 3, wherein A is barium.

5. The method as claimed in claim 1, wherein M is a pentavalent metal.

6. The method as claimed in claim 5, wherein the molar ratio of $Fe_2O_3:CoO:MO_{2.5}$ is about 9.4:2:1 to 22.50:2:1.

7. The method as claimed in claim 6, wherein A is barium.

8. The method as claimed in claim 6, wherein the glass forming substance is $B_2O_3$, $P_2O_5$, or $SiO_2$.

9. The method as claimed in claim 8, wherein said glass forming material is $B_2O_3$.

10. The method as claimed in claim 8, wherein said glass forming substance further comprises barium oxide.

11. The method as claimed in claim 1, wherein said fine particles are separated from the amorphous material by dissolving the amorphous material with an acid.

12. The method as claimed in claim 1 or 9, wherein a heat treatment is performed at 700° to 850° C. for 2 hours or more.

* * * * *